May 3, 1938.  R. ROMOLGO  2,116,283

THERMOMETER CASE

Filed June 2, 1937

Inventor

Rhombodo Romolgo,

By Clarence A. O'Brien
Hyman Berman
Attorneys

Patented May 3, 1938

2,116,283

UNITED STATES PATENT OFFICE 2,116,283

THERMOMETER CASE

Rhombodo Romolgo, West Los Angeles, Calif.

Application June 2, 1937, Serial No. 146,099

1 Claim. (Cl. 206—16.6)

This invention relates to a thermometer case, the general object of the invention being to provide the case with a chamber for containing a fumigating agent, with means whereby a valve is opened when the thermometer is placed in the case to permit the agent to contact the thermometer to sterilize the same, the valve closing as soon as the thermometer is removed from the case.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
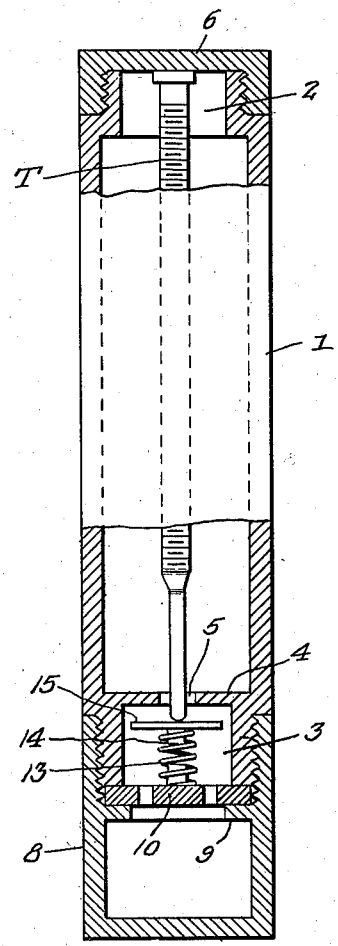
Figure 1 is an elevation, with parts in section, of the improved case, with the thermometer therein.
Figure 2:
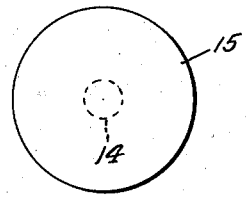
Figure 2 is a top plan view of the valve.
Figure 3:
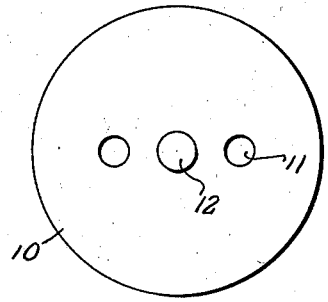
Figure 3 is a similar view of the perforated supporting disk.

In this drawing, the numeral 1 indicates the case having a reduced threaded neck 2 at one end and a similar neck 3 at the other end, the neck 3 being longer than the neck 2. A partition 4 separates the main part of the case from the neck part 3 and has an opening 5 therein for placing the two parts in communication with each other.

A cap 6 is adapted to be threaded on the neck 2 and the thermometer T is fastened to the inner face of this cap, so that when the cap is in place the thermometer extends through the case with its free end passing through the opening 5 in the partition 4 into the neck 3.

A long cap 8 is adapted to be threaded on the neck 3 and said cap 8 has an annular collar 9 intermediate its ends, which forms a seat for a disk 10 which is provided with the holes 11 and the stud 12. A coiled spring 13 has one end encircling the stud 12 and its other end encircles a stud 14 on a valved disk 15, which is normally held against the partition 4 covering the opening 5 by the spring 13.

As will be seen, the disk 10 is held on the collar 9 by the end of the reduced neck 3, with the spring and valved disk 15 located in the neck.

A suitable fumigating gas or agent is placed in the chamber formed by the cap 8 and, of course, this agent will pass through the holes 11 into the neck 3, but when the cap 6 and thermometer have been removed from the case, the valve 15 will be closing the opening 5, so that this agent cannot pass into the case.

However, when the thermometer is inserted and the cap 6 screwed home, the free end of the thermometer will pass through the opening 5 and unseat the valved disk 15 so that the fumigating agent can enter the case and thus contact the thermometer to sterilize the same. As soon as the cap and thermometer are removed, the spring will again close the valve 15 and thus prevent further passage of the agent into the case.

With this invention, the thermometer is at all times kept in a sterilized condition and it is not necessary to dip the thermometer into a sterilizing solution. The thermometer is, therefore, ready for use as soon as it is removed from the case and is rendered sterile again after use when it is put back into the case.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A thermometer case comprising a hollow elongated body having a reduced threaded neck at each end thereof, a perforated partition separating one neck from the body, a cap threaded on said one neck and having a shoulder forming part therein, a perforated member held between the shoulder forming member and the end of said one neck, the shoulder forming member being spaced from the end of the cap to form a chamber for receiving a sterilizing medium which can pass into the said one neck through the perforations, a valve for closing the opening in the partition, a spring between the valve and the perforated member, and a cap closing the other end of the body and threaded on the neck and carrying the thermometer, the free end of which will open the valve when the last mentioned cap is put in place.

RHOMBODO ROMOLGO.